Nov. 4, 1947. F. G. VAN DYKE 2,430,376
ELECTRODE HOLDER
Filed Feb. 1, 1943 5 Sheets-Sheet 1

INVENTOR.
FRANK G. VAN DYKE
BY

Nov. 4, 1947.　　　F. G. VAN DYKE　　　2,430,376
ELECTRODE HOLDER
Filed Feb. 1, 1943　　　5 Sheets-Sheet 2

INVENTOR.
FRANK G. VAN DYKE
BY Thos. L. Donnelly
Attorney

Nov. 4, 1947.      F. G. VAN DYKE      2,430,376
ELECTRODE HOLDER
Filed Feb. 1, 1943      5 Sheets-Sheet 3

INVENTOR.
FRANK G. VAN DYKE
BY Thos. S. Donnelly
attorney

Nov. 4, 1947.     F. G. VAN DYKE     2,430,376
ELECTRODE HOLDER
Filed Feb. 1, 1943     5 Sheets-Sheet 4

INVENTOR.
FRANK G. VAN DYKE
BY

Nov. 4, 1947.  F. G. VAN DYKE  2,430,376
ELECTRODE HOLDER
Filed Feb. 1, 1943  5 Sheets-Sheet 5
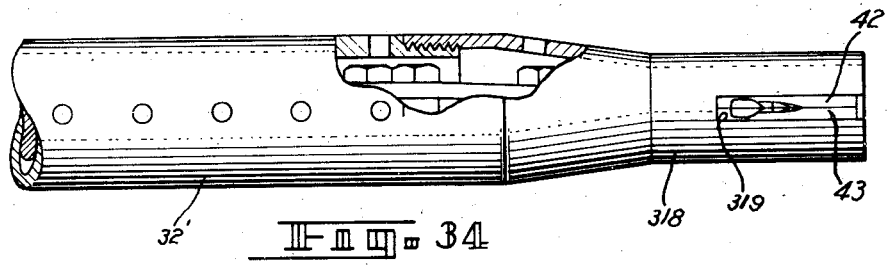
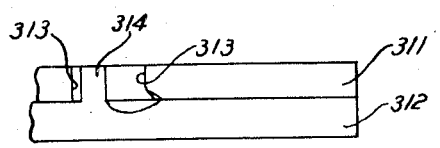 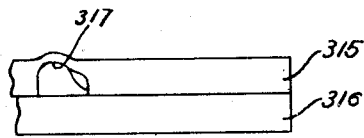
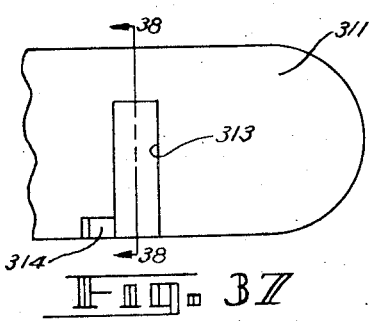 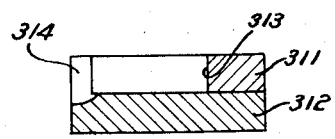
INVENTOR.
FRANK G. VAN DYKE
BY Patented Nov. 4, 1947

2,430,376

UNITED STATES PATENT OFFICE 2,430,376

ELECTRODE HOLDER

Frank G. Van Dyke, Detroit, Mich., assignor to Bordon Mfg. Co., Inc., Detroit, Mich., a corporation of Michigan Application February 1, 1943, Serial No. 474,387

8 Claims. (Cl. 219—8)

My invention relates to a new and useful improvement in a holding device. It is particularly adapted for use in an electrode holder used in arc welding operations. The invention provides a tool whereby a small rod such as a welding electrode may be securely clamped in position for use and easily and quickly released for replacement with a new rod. In welding operations, the operator burns or uses up the electrodes in a comparatively short period of time so that in the course of an hour the operator will release from the holder many of the stubs or remaining portions of the electrode and replace the used stub with a new electrode or rod. This operation, repeated many times during an hour, of course, consumes considerable time. With the usual type of electrode, where the gripping members or jaws are spring pressed into clamping relation with the electrode, the release of the electrode from the holder requires a muscular action by the operator, which, when repeated quite frequently, gives rise to fatigue.

It is an object of the present invention to provide an electrode holder whereby the operator may eject the stub of a used electrode easily and quickly while inserting the new electrode in position.

It is another object of the present invention to provide a holder of this type whereby the electrode may be freely inserted into the holder in one position and then swung into operative position as a lever while bearing at one end against the holder as a fulcrum.

It is another object of the present invention to provide a holder so constructed and arranged that an electrode may be freely inserted therein in one position and swung as a lever, while bearing against the holder as a fulcrum, in one direction to eject a stub held in the holder and then swung in the opposite direction as a lever while bearing against the holder as a fulcrum, into operative position.

It is another object of the invention whereby an electrode when inserted into the holder may serve as a member for ejecting a stub from the holder as the new electrode is being swung into operative position on the holder.

Another object of the invention is the provision of an electrode holder so constructed and arranged that the electrode itself provides the means for spreading the gripping jaws apart for the reception of the electrode.

Another object of the invention is the provision of an electrode holder having gripping jaws and a handle with the jaws inclined to the axis of the handle so that the electrode holder therein has its axis directed at an incline to the handle.

Other objects will appear hereinafter.

It is recognized that various modifications and changes may be made in the detail of structure illustrated without departing from the invention itself, and it is intended that such variations and modifications shall be encompassed within the claims forming a part hereof.

Forming a part of this specification are drawings in which,

Fig. 34 is a fragmentary side elevational view of a holder embodying the invention showing insulation mounted thereon.

Fig. 35 is a fragmentary side elevational view of a pair of jaws showing another modification.

Fig. 36 is a fragmentary side elevational view of a pair of jaws showing another modification.

Fig. 37 is a fragmentary plan view showing the inner face of a jaw embodying the modification shown in Fig. 36.

Fig. 38 is a sectional view taken on line 38—38 of Fig. 37.

Figure 1:
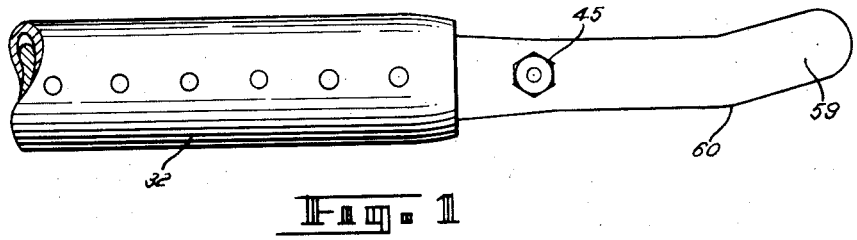
Fig. 1 is a side elevational view of the invention.

In the drawings I have illustrated the invention used as a holder for small articles such as wire, rods, tubes, etc. and particularly electrodes in which a handle 32 of insulating material such as fiber or the like is used. This handle is provided with a steel liner 33 having an opening 34 formed therein registering with the opening 35 in the handle 32 through which the set screw 36 is accessible. This set screw threads into a metal shank 37 in which the bared end 38 of a cable 39 is secured by soldering or in any other suitable manner. By backing out the set screw 36 the shank 37, which may be termed a cable connector, is cramped or bound in the handle 32. Projecting forwardly from the shank 37 is a tongue 40 on which is secured, by means of the bolts 41, the butt ends of the jaws 42 and 43 which are formed from suitable resilient material. A bolt 44 provided with the nut 45 is projected through the jaws 42 and 43 and serves as a means for adjusting the tension of engagement of the forward ends of the jaws 42 and 43 with each other and also as a means for determining the line of flex of these jaws.

Holders having resilient jaws whereby the pressure on the electrode is determined by the inherent resiliency of the jaws are quite common. Another type of holder, however, is a structure where one of the jaws is pivotally mounted on the other and spring pressed against the other. From a description of the invention, it will, it is believed, appear obvious that the invention may be used on either of these types of holders with equal facility.

Formed in the opposed faces of the jaws 42 and 43 are registering grooves 46 and 46' which together serve to form a passageway into which the end of an electrode 47 may be freely inserted. Formed in the opposed faces of the jaws 42 and 43 are the grooves 48 and 48', which together also serve to form a passage for the reception of the electrode 47. These grooves 48 and 48' communicate at their ends with the grooves 49 and 49', respectively, which together form a passage of less diameter than the diameter of the electrode 47. At the inner end of the grooves 49 or 49' is a depression or well 50 of substantially the same depth as the grooves 48 or 48'.

Figure 6:
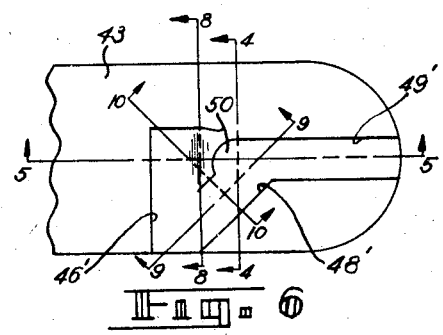
Fig. 6 is a fragmentary slightly enlarged plan view showing the inner face of one of the jaws.
Figure 4:
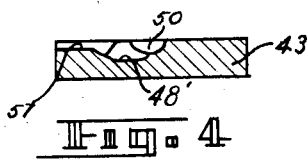
Fig. 4 is a sectional view taken on line 4—4 of Fig. 6.
Figure 5:
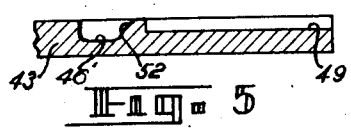
Fig. 5 is a sectional view taken on line 5—5 of Fig. 6.
Figure 7:
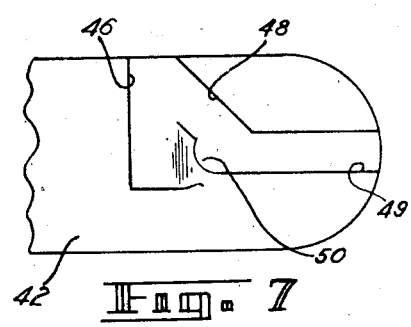
Fig. 7 is a fragmentary slightly enlarged plan view showing the inner face of the other jaw.
Figure 8:
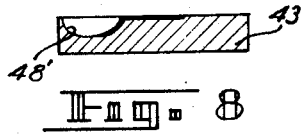
Fig. 8 is a sectional view taken on line 8—8 of Fig. 6.
Figure 9:
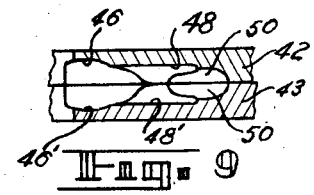
Fig. 9 is a fragmentary sectional view taken on line 9—9 of Fig. 6 showing both jaws in position.
Figure 12:
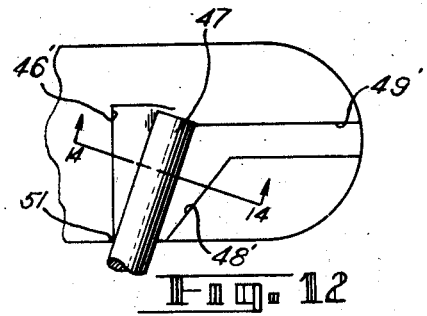
Fig. 12 is a view similar to Fig. 11 showing the electrode swung toward its ejecting or second position but with the movement incompleted.
Figure 13:
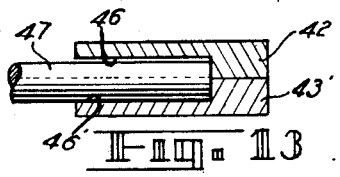
Fig. 13 is a sectional view taken on line 13—13 of Fig. 11 showing both jaws in assembled relation.
Figure 14:
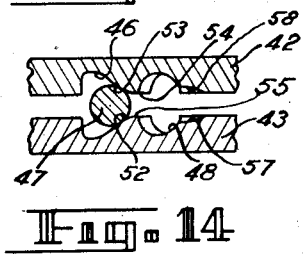
Fig. 14 is a fragmentary sectional view taken on line 14—14 of Fig. 12 showing both jaws in their assembled position.
Figure 16:
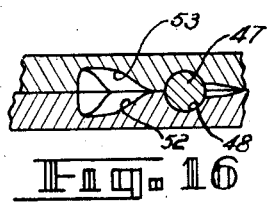
Fig. 16 is a fragmentary sectional view taken on line 16—16 of Fig. 15 showing both jaws in position.
Figure 15:
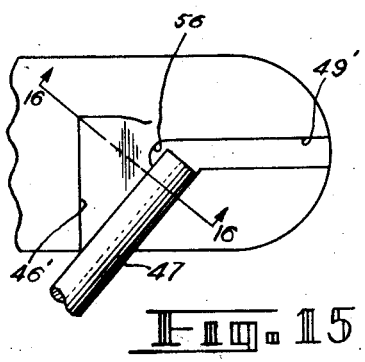
Fig. 15 is a view similar to Fig. 12 showing the electrode swung to a position where its ejecting or secondary position has been reached.
Figure 17:
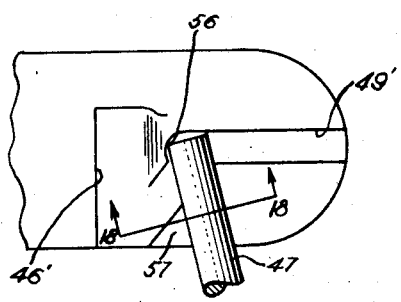
Fig. 17 is a view similar to Fig. 15 illustrating the electrode in a position of swinging from its ejecting position to operative position.
Figure 19:
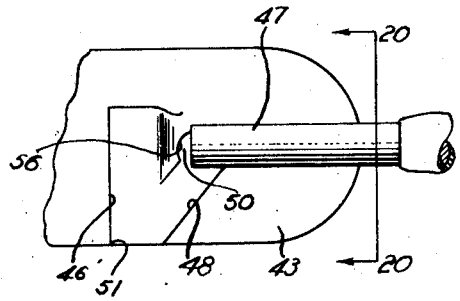
Fig. 19 is a view similar to Fig. 17 showing the electrode swung to its operative or final position.
Figure 18:
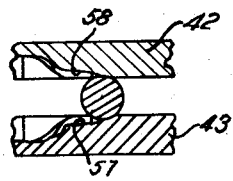
Fig. 18 is a fragmentary sectional view taken on line 18—18 of Fig. 17 showing both jaws in position.
Figure 20:
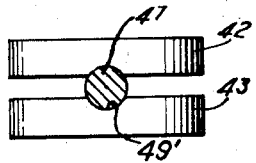
Fig. 20 is a front view taken on line 20—20 of Fig. 19.

When the jaws shown in Fig. 6 and Fig. 7 are superimposed upon each other so that the illustrated faces are opposed to each other, it is obvious that the grooves 46 and 46' will be in registration as well as the grooves 48 and 48' and the grooves 49 and 49', these opposed faces being firmly secured in engagement through the resilient means present. When the electrode is inserted inwardly in the passage formed by the grooves 46 and 46', the outer end of the electrode 47 may be rocked as a lever, bearing against the jaws 42 and 43 at substantially the point 51 which serves as a fulcrum. The inserted end of the rod 47 is then moved forwardly as shown in Fig. 12 and in this movement the rod rides over the cam surfaces 52 and 53, the portions 54 and 55 serving as cams. As this swinging movement begins, the jaws 42 and 43 are spread apart as shown in Fig. 14 so as to release the grip on the stub of the electrode which may be engaged in the grooves 49 and 49'. As this movement continues, the electrode 47 will snap at its inserted end into engagement with the butt end of the electrode stub which may be gripped in the grooves 49 and 49'. The spreading of the jaws is effected, as shown in Fig. 14. As the electrode 47 rides off of the cams 55 and 54, it will snap downwardly into the position shown in Fig. 15, and in this sudden snapping movement will deliver a sudden thrust against the butt end of the electrode stub so as to eject it clear of the jaws 42 and 43 if it has not already fallen out. Sometimes these electrode stubs "freeze" in position and this sudden "kick" of the newly inserted electrode butt end is usually sufficient to break the bond of the "frozen" stub and eject it. The electrode 47 is then swung in the opposite direction, bearing against the jaws as a fulcrum at substantially the point 56 so as to move into the position shown in Fig. 17, and in moving into this position the electrode 47 rides over the inclined surfaces 57 and 58 to spread the jaws apart as shown in Fig. 18. As the electrode 47 moves into registration with the grooves 49 and 49', the electrode 47 will snap into the position shown in Fig. 19 where it is securely held in position for use. It will be noted that no spreading mechanism is used to spread the jaws apart other than the electrode itself, while at the same time a positive spreading apart of the jaws is effected.

It will also be noted that the forward portions 59 of the jaws are angularly turned as at 60 so that when the electrode 47 is gripped in the jaws, its axis extends at an incline to the axis of the handle 32. Since the holder is free from all outward projections such as triggers or other spreading mechanism, the handle may be rotated so as to be held in the hand in any desired position, thus making it possible for the operator to obtain any desired angle of inclination of the electrode which projects axially outwardly from the center of the angularly turned portions 59 of the jaws.

Figure 21:
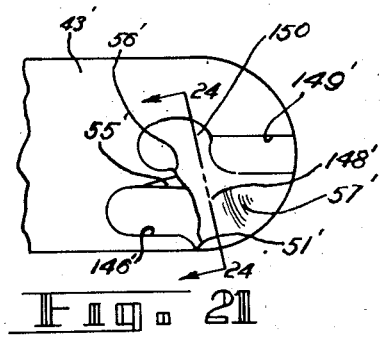
Fig. 21 is a slightly enlarged fragmentary plan view showing the inner face of one of the jaws with a slight modification.
Figure 22:
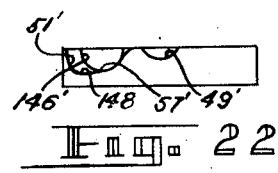
Fig. 22 is a front elevational view of the form shown in Fig. 21.
Figure 23:
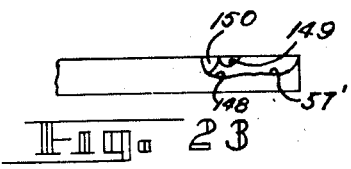
Fig. 23 is a fragmentary side elevational view of the form shown in Fig. 21.
Figure 24:
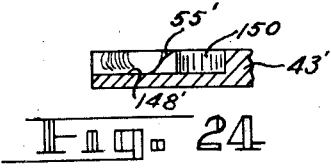
Fig. 24 is a fragmentary sectional view taken on line 24—24 of Fig. 21.

In Fig. 21 I have shown a slight modification of the structure. The groove 146' corresponds to the groove 46' and this groove 146' is directed substantially axially of the jaw 43'. It will be noted that the groove 48' as shown in Fig. 6 inclines forwardly of the jaw 43. The corresponding groove 148' in Fig. 21 does not so incline. The cam or projection 55' shown in Fig. 21 corresponds to the cam 55 shown in Fig. 14 and the point of fulcrum 51' shown in Fig. 21 corresponds to the point 51 shown in Fig. 12. When the electrode has ridden over the cam 55' shown in Fig. 21, it will lie in the groove 148' and may then be swung forwardly at its outer end bearing against the point 56' as a fulcrum which corresponds to the point 56 shown in Fig. 15. The groove 149' corresponds to the groove 49' shown in Fig. 6 and this groove at its inner end communicates with a well 150 corresponding to the well 50 shown in Fig. 6 or Fig. 7. The surface 57' in Fig. 21 corresponds to the inclined surface 57 shown in Fig. 18 or in Fig. 17.

In function and operation the form shown in Fig. 21 to Fig. 24, inclusive, is substantially the same as the preferred form previously described.

It will be noted that if there is no stub engaged in the groove 49 and 49', the operator may in inserting a new electrode insert the electrode in the passage formed by the grooves 48 and 48'. The electrode would then be in the position shown in Fig. 15. Forward swinging of the outer end of the electrode while it bears against the point 56 as a fulcrum would then cause the electrode to snap into position between the grooves 49 and 49'. It is only when an electrode is already engaged in the grooves 49 and 49' that the operator would insert the electrode in the passage formed by the grooves 46 and 46' in the structure shown in Fig. 6 and Fig. 7 or in the passage formed by the cooperating grooves 146' shown in Fig. 21. In the form shown in Fig. 21, the operator, when no electrode is engaged in the grooves 149', would insert the electrode in the passage formed by the cooperating grooves 148, and then while bearing against the point 56' swing the electrode around to operative position.

Figure 2:
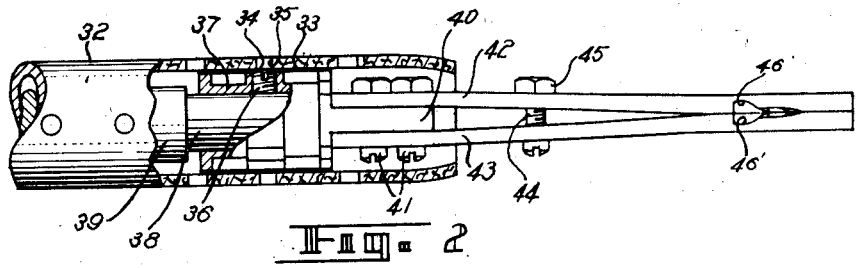
Fig. 2 is a side elevational view of the invention taken at right angles to Fig. 1 with parts broken away and parts shown in section.
Figure 3:
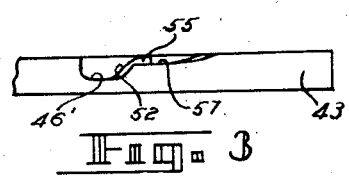
Fig. 3 is a fragmentary side elevational view of one of the jaws used in the invention.
Figure 25:
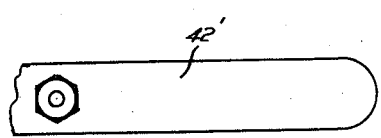
Fig. 25 is a fragmentary elevational view showing the jaws in straight form instead of angularly turned as shown in Fig. 1.

In Fig. 25 I have shown the holder with the jaw 42' corresponding to the jaw 42 shown in Fig. 1 and Fig. 2. It will be noted that the bend illustrated in Fig. 1 has been eliminated in Fig. 25 as some operators may prefer the bend and others may prefer the straight form.

Figure 26:
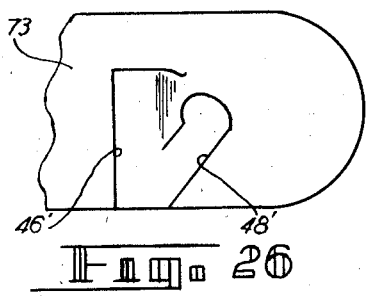
Fig. 26 is a fragmentary plan view of the inner face of a jaw showing a slight modification.
Figure 27:
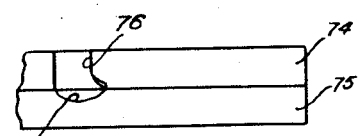
Fig. 27 is a fragmentary side elevational view of a pair of jaws showing a slight modification.
Figure 28:
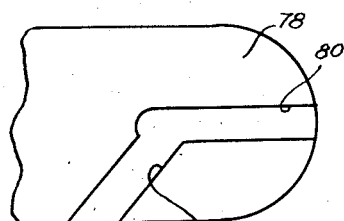
Fig. 28 is a fragmentary plan view of the inner face of one of the jaws showing another modification.

In Fig. 26 I have shown the jaw 73 corresponding to the jaw 43 of Fig. 6. The grooves 46' and 48' are present but the groove 49' has been eliminated so that the rod may be securely gripped at various angles of inclination without being retained in any defined location. In Fig. 27 I have shown a jaw 74 cooperating with the jaw 75. A notch 76 is cut into the jaw 74 overlying the groove 77 in the jaw 75. The grooves 77, of course, may be eliminated if desired. The notch would thus form the electrode receiving passage which, in Figs. 6 and 7, is formed by the cooperating grooves 46 and 46'. In Fig. 28 I have shown a jaw 78 having the groove 79 communicating with the groove 80. The groove 79 corresponds to the groove 48' and 48 shown respectively in Figs. 6 and 7 so that the grooves 46' and 46 shown in Figs. 6 and 7 have been eliminated.

Figure 29:
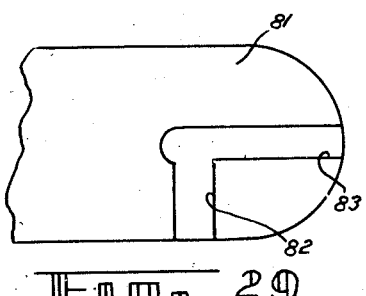
Fig. 29 is a fragmentary plan view of one of the jaws showing the inner face thereof with a slight modification.

In Fig. 29 I have shown a jaw 81 having the groove 82 communicating with the groove 83. This is similar to that shown in Fig. 28 excepting that the groove 82 is extended perpendicularly to the longitudinal axis of the jaw 81, whereas the groove 79 is at an inclination thereto.

Figure 10:
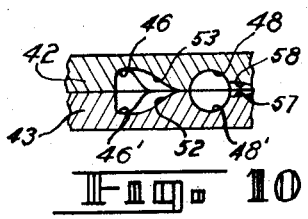
Fig. 10 is a fragmentary sectional view taken on line 10—10 of Fig. 6 showing both jaws in position.
Figure 11:
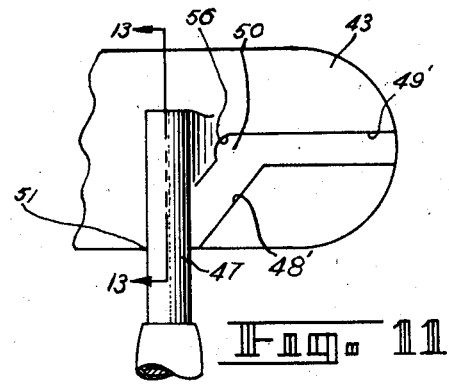
Fig. 11 is a fragmentary slightly enlarged plan view of one of the jaws showing the electrode inserted in its initial position.
Figure 30:
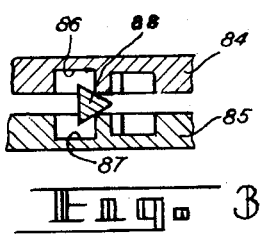
Fig. 30 is a transverse sectional view of a pair of jaws showing a modification.

In Fig. 30 I have shown a pair of jaws 84 and 85 having the grooves 86 and 87 which together form the rod receiving passage. The inclined faces 52 and 53 which appear in Fig. 14 or in Fig. 10 have been eliminated and a rod 88 triangular in cross-section is used. The sharp edge of the rod 88 would effect the desired spreading.

Figure 31:
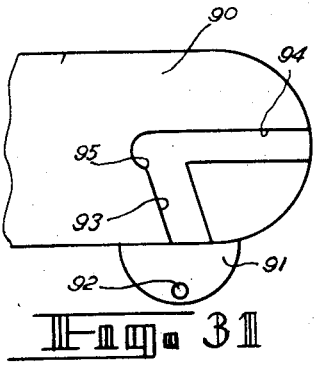
Fig. 31 is a fragmentary plan view of the inner face of one of the jaws showing a further modification.
Figure 32:
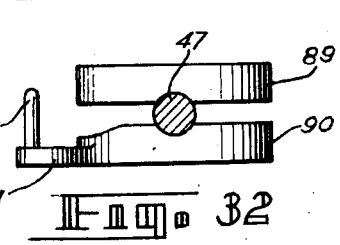
Fig. 32 is an end elevational view of a pair of jaws embodying the modification shown in Fig. 31.

In Figs. 31 and 32 I have shown a pair of jaws 89 and 90. A lug 91 is carried by the jaw 90 and projected outwardly therefrom and provided with the upwardly extending stud 92. The lug is positioned opposite the groove 93 communicating with the groove 94. By inserting an electrode between the stud 92 and the end faces of the jaws, the stud 92 may be used as a fulcrum for swinging the butt end of the jaw into position to lie in the groove 93, from which it may be swung into the groove 94 bearing against the point 95.

Figure 33:
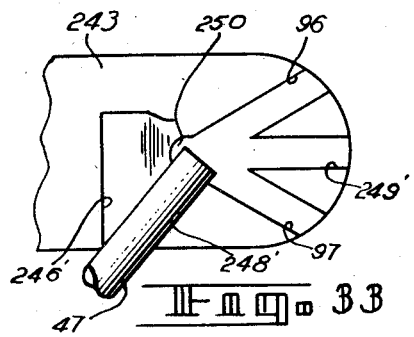
Fig. 33 is a fragmentary plan view of one of the jaws showing the inner face thereof with a slight modification.

In Fig. 33 I have shown a view similar to that shown in Fig. 6 in which the groove 246' formed in the jaw 243 corresponds to the groove 46' shown in Fig. 6. The groove 248' corresponds to the groove 48' shown in Fig. 6. The well 250 corresponds to the well 50 shown in Fig. 6. The groove 249' corresponds to the groove 49' shown in Fig. 6. This groove 49' shown in Fig. 6 determines the operative position of the electrode when gripped by the holder. In addition to this groove 249', I also provide the grooves 96 and 97 so that the electrode may project outwardly from the gripping jaws at different angles of inclination.

In Fig. 36 I have shown a pair of jaws 311 and 312 and a notch 313 is formed in the jaw 311 to receive the end of an electrode which may be inserted therein. Projecting upwardly adjacent the notch is a stud 314 which will serve as a fulcrum for the inserted end of an electrode which may be placed in the notch 313.

In Fig. 35 I have shown a pair of jaws 315 and 316. A passage or groove 317 is formed in the jaw 315 corresponding in function and in operation to the cooperating jaws 46 and 46' shown in Fig. 7. In Fig. 34 I have illustrated the electrode holder constructed in a manner whereby the gripping jaws, such as 42 and 43, are enclosed by a tube 318 made from suitable insulating material and secured to the handle 32' by threading or in any other suitable manner. A lateral slot 319 is formed in the forward end of the tube 318 to permit the insertion of the butt end of the electrode therein and the swinging of the same in the manner described.

In all of the forms shown, there is provided an engagement portion on the jaws which serves as a fulcrum when the rod is being swung while in engagement therewith. Regardless of the form in which constructed, there is provided a passage or space for reception of the butt end of the inserted electrode, and the electrode is swung from inoperative to an operative position. It may also be swung to an ejecting position, that is, to a position at which it ejects the stub of the used electrode.

It is believed obvious that the operator may very easily and quickly remove and replace an electrode in a holder of this type. It is also believed obvious that the holder is lighter than would be the case did it carry a mechanism for spreading the jaws apart. With a holder of this type, because of the absence of outward projections such as triggers or the like, access is easily sustained in narrow places, thus rendering the holder highly efficient in close work.

Experience has shown that the holder is quite efficient in operation in that it does hold the electrode firmly while a welding operation is being carried on. By adjusting the nut 45 on the bolt 44, the holder may be also adjusted to accommodate various kinds of electrodes.

What I claim as new is:

1. In an electrode holder of the class described, a pair of gripping members normally spring held in close approach adapted for gripping an electrode therebetween and having a groove between opposed faces for reception of and for determining the operative position of the electrode relatively to said members, there being a passage between said members rearwardly of the forward end thereof for the free reception of an inserted end of an electrode; an engagement portion on said members for engaging and forming a fulcrum for said electrode upon swinging of the same in one direction; a second engagement portion on said members for, subsequent to swinging of said electrode a predetermined distance in said direction, engaging said electrode and forming a fulcrum therefor upon swinging of the same in the opposite direction, the location of said second engagement portion and said groove being such that upon a swinging of said electrode in said opposite direction, while in engagement with said second engagement portion, a predetermined distance, said electrode will have moved into registration with said groove, said electrode being of sufficient size for spreading said members apart upon said swinging movement.

2. In an electrode holder of the class described, a pair of gripping members normally spring held in close approach and adapted for gripping an electrode therebetween and retaining the same in operative position relatively thereto; an engagement portion between the outer faces of said members for engaging the end of an electrode inserted therebetween and forming a fulcrum therefor upon swinging of the same relatively to said members, said inserted end of said electrode being swingable, while in engagement with said fulcrum, relatively to said members into ejecting position for engaging and ejecting an electrode retained by said members in operative position; a second engagement portion between the outer faces of said members positioned forwardly of said first-mentioned engagement portion for engaging said inserted end of said electrode and forming a fulcrum therefor upon swinging thereof, said inserted end of said electrode being swingable while in engagement with said second mentioned engagement portion from ejecting position to operative position relative to said members.

3. In an electrode holder of the class described, a pair of gripping members normally spring held in close approach and adapted for gripping an electrode therebetween and retaining the same in operative position and having a passage between the outer faces thereof for reception of an inserted end of an electrode; and engagement portion on one of said members rearwardly of said passage for engaging said inserted end of said electrode and forming a fulcrum therefor upon swinging thereof, said inserted end being swingable while in engagement with said engagement portion to ejecting position for engaging and ejecting an electrode retained between said members in operative position, said electrode being of sufficient size for spreading said members apart upon movement to ejecting position, said inserted end of said electrode being swingable from ejecting position to operative position; a second engagement portion between the outer faces of said members forwardly of said first-mentioned engagement portion for engaging said inserted end of said electrode and forming a fulcrum therefor upon swinging of the same from ejecting to operative position.

4. An electrode holder of the class described, a pair of gripping members normally spring held in close approach and adapted for gripping an electrode therebetween and retaining the same in operative position and having a passage between the outer faces thereof for reception of an inserted end of an electrode; an engagement portion on one of said members adjacent said passage for engaging said end of said electrode and forming a fulcrum therefor upon swinging of said electrode in one direction; a second engagement portion on one of said members, forwardly of said first named engagement portion, said inserted end being swingable while in engagement with said first named engagement portion to ride over said second named engagement portion for engaging and ejecting an electrode retained between said members in operative position, said second named engagement portion forming a fulcrum for the inserted end of said electrode, subsequent to the riding over the same by said inserted end, for forming a fulcrum for said electrode upon the swinging of said electrode in the opposite direction.

5. In an electrode holder of the class described, a pair of gripping members normally spring-held in close approach and adapted for gripping an electrode therebetween and retaining the same in operative position and having a passage between the outer faces thereof for reception of an inserted end of an electrode; an engagement portion on one of said members adjacent said passage for engaging said inserted end of said electrode and forming a fulcrum therefor upon swinging thereof in one direction; a second engagement portion between the outer faces of said members, forwardly of said first named engagement portion, said inserted end of said electrode being swingable, while in engagement with said first named engagement portion, over said second named engagement portion to ejecting position for engaging and ejecting an electrode retained between said members in operative position, said electrode being of sufficient size for spreading said members apart upon movement to ejecting position, said inserted end of said electrode being swingable from ejecting position to operative position and said second named engagement portion forming a fulcrum for said electrode upon a swinging of the same from ejecting to operative position.

6. In an electrode holder of the class described, a pair of gripping members normally spring held in close approach for gripping an electrode therebetween and adapted for reception, rearwardly of their forward ends, of the butt end of an electrode inserted therebetween; an engagement portion on said gripping members, rearwardly of the forward ends thereof for engaging the butt end of said electrode and preventing rearward movement of the same relatively to said gripping members upon forward swinging of the outer portion of said electrode relatively to said gripping members.

7. In an electrode holder of the class described, a pair of gripping members normally spring held in close approach adapted for gripping an electrode therebetween and having a groove between opposed faces for reception of and for determining the operative position of said electrode relatively to said members, said gripping members being adapted for reception, rearwardly of their forward ends, of the butt end of an electrode inserted therebetween; engagement means on said gripping members rearwardly of the forward ends thereof for engaging the butt end of said electrode and preventing rearward movement of the same relatively to said gripping members upon swinging of the outer portion of said electrode relatively to said gripping members for engagement in said grooves.

8. In an electrode holder of the class described, a pair of gripping members normally spring held in close approach for gripping an electrode therebetween and adapted for reception, rearwardly of their forward ends, of the butt end of an electrode therebetween; and engagement means on said gripping members rearwardly of the forward ends thereof for engaging the inserted butt end of the electrode and limiting rearward and lateral movement thereof upon the forward swinging of the outer portion of said electrode.

FRANK G. VAN DYKE.

REFERENCES CITED

The following references are of record in the file of this patent:

UNITED STATES PATENTS

| Number | Name | Date |
| --- | --- | --- |
| 1,730,397 | Waglie | Oct. 8, 1929 |
| 1,927,270 | Malner | Sept. 19, 1933 |
| 2,178,292 | Thibodeau | Oct. 31, 1939 |
| 1,551,729 | Burns | Sept. 1, 1925 |
| 2,162,112 | Nickels | June 13, 1939 |